Figure 3:
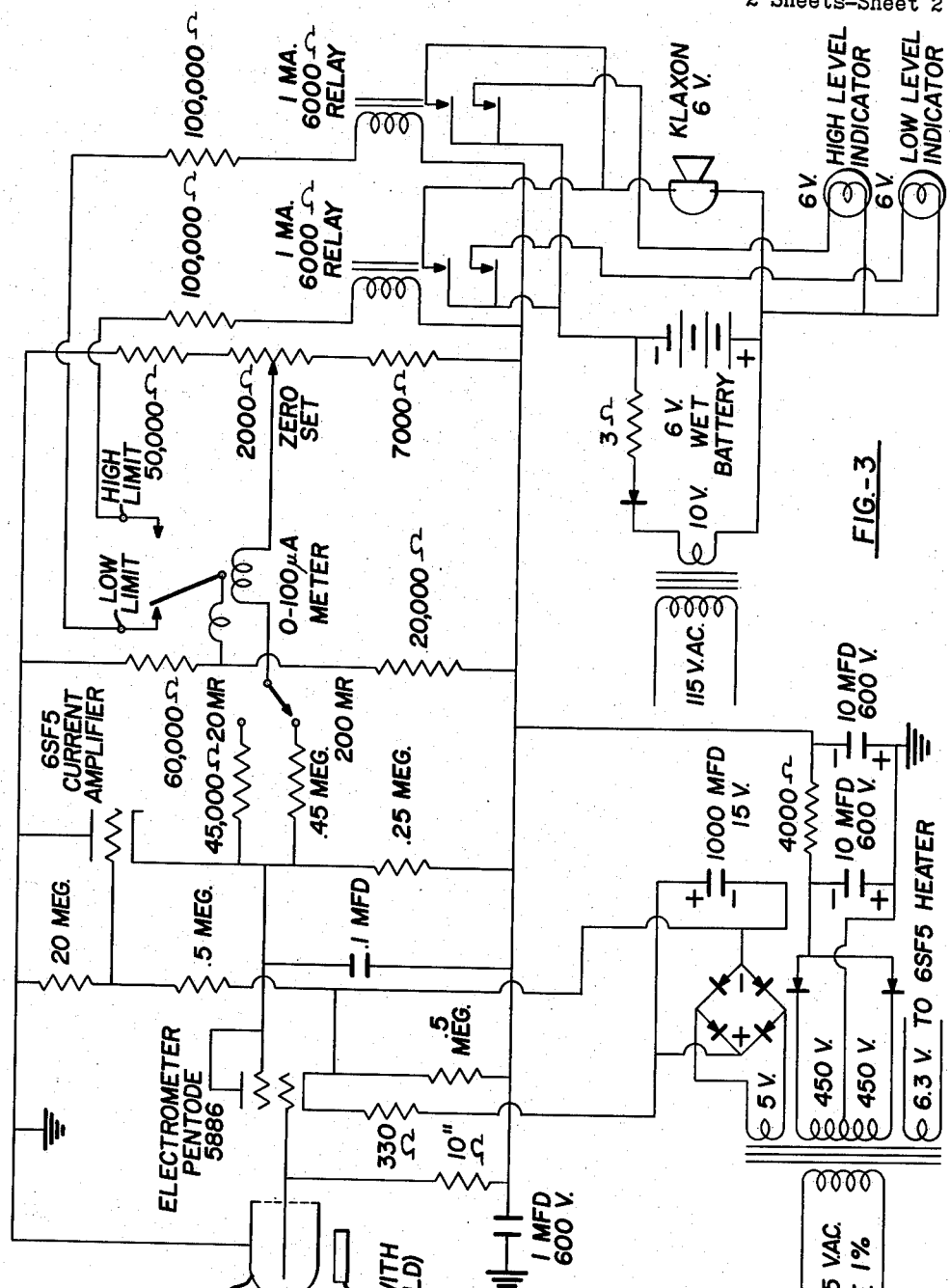

Dec. 6, 1960  J. A. WILSON  2,963,588
SAFETY DEVICE FOR RADIATION LEVEL MONITOR SYSTEMS
Filed Feb. 9, 1956  2 Sheets-Sheet 1
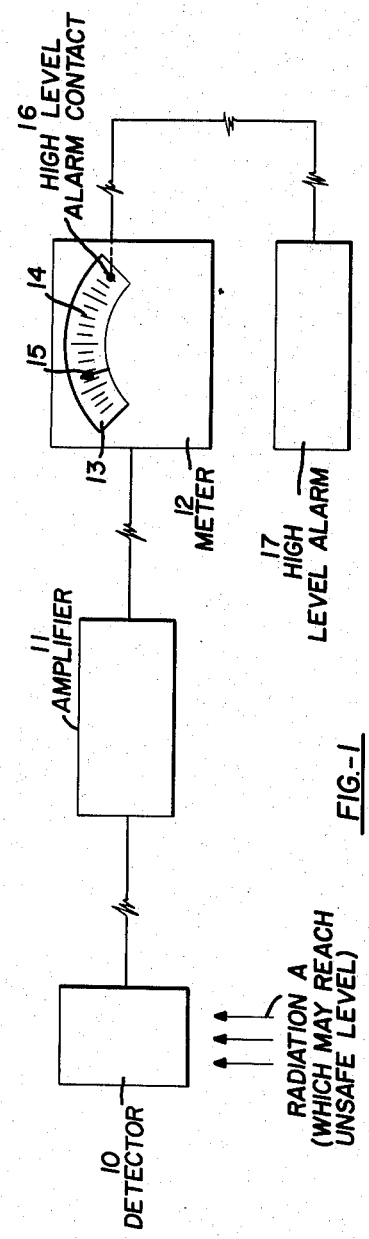
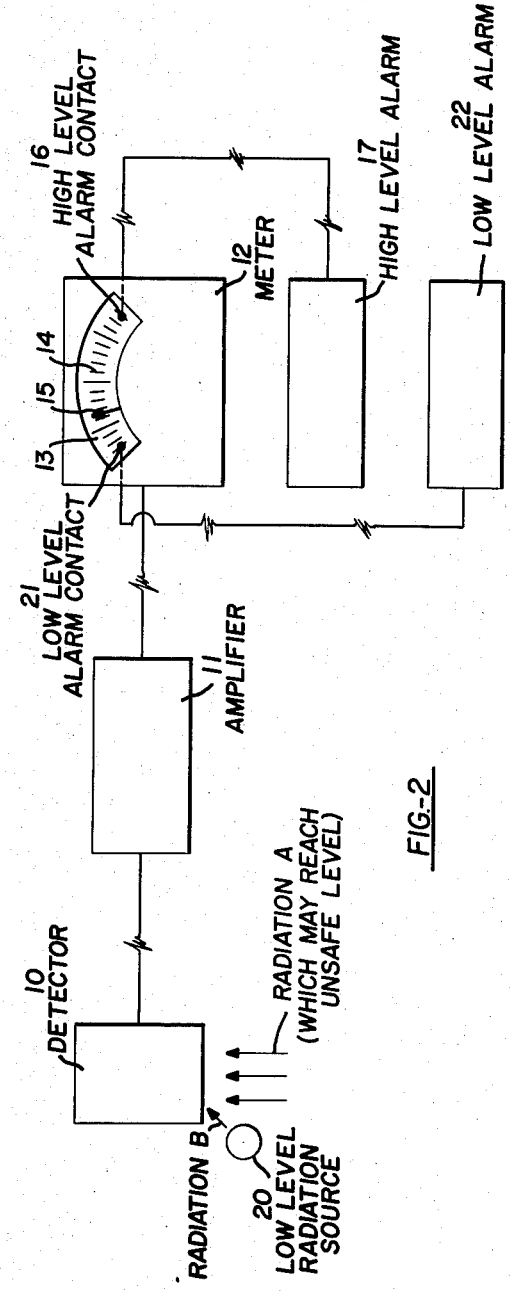
James A. Wilson  Inventor
By *E. J. Brenner*  Attorney James A. Wilson  Inventor
By E.J. Brenner  Attorney

United States Patent Office 2,963,588
Patented Dec. 6, 1960

2,963,588

SAFETY DEVICE FOR RADIATION LEVEL MONITOR SYSTEMS

James A. Wilson, Stanhope, N.J., assignor to Esso Research and Engineering Company, a corporation of Delaware Filed Feb. 9, 1956, Ser. No. 564,458

4 Claims. (Cl. 250—83.6)

This invention relates to radioactivity and more particularly relates to the detection and measurement of radioactivity. Still more particularly, the present invention relates to a safety device for radiation level monitor systems and to its method of operation.

In the past decade, there have been tremendous strides made in the field of atomic energy. The applications of atomic energy include atomic piles or nuclear reactors, the use of radioisotopes as tracers in chemical, petroleum, agricultural and biological research, atomic weapons, the use of atomic energy as a means for effecting chemical reactions and the like. One of the major problems encountered in the field of atomic energy relates to the hazards, particularly to personnel, resulting from exposure to the high intensity ionizing radiation or nuclear radiation encountered. The protection of personnel from gamma rays is particularly important. A number of radiation detectors have been developed for the purpose of measuring the level of radiation encountered when working in the field of atomic energy. Examples of such detectors include Geiger counters, scintillation counters and film badges.

The use of radiation detectors which operate upon the principle of producing an electrical signal substantially proportional to the intensity of radiation is particularly desirable since these detectors give an immediate indication of the level of radiation being measured. Such detectors are frequently installed permanently in working areas wherein dangerous levels of radiation may be encountered. Generally these radiation level monitor systems include an alarm system such as bells, flashing lights, etc. whereby personnel are notified of the presence of dangerous levels of radiation. However, these monitor systems are subject to possible failure for various reasons. For example, the monitor system can fail for any of the following reasons among others: (1) power failure to the monitor apparatus, (2) tube failure in the apparatus, (3) physical damage to the apparatus, and (4) destruction of the sensitive element or some other part of the radiation detector due to extraordinarily high radiation.

The present invention provides a positive means for indicating such a failure of the radiation level monitor apparatus. More particularly, in accordance with the present invention, a safety device is provided which comprises a source of substantially constant low level radiation disposed near the radiation detector of the radiation level monitor apparatus. In this way, the meter of the monitor apparatus receives a substantially uniform and constant small electrical signal due to the radiation emitted from the low level radiation source. The proper functioning of the monitor apparatus is indicated when receiving this constant electrical signal. In the event of the failure of the monitor apparatus, this electrical signal is not received. This fact may be noted visually on the meter although it is preferred that it also be indicated more positively by means of some special alarm such as flashing lights, bell, etc. The preferred source of low level radiation is a fixed sample of a radioisotope having a relatively long half life.

The present invention will be best understood by reference to the accompanying drawings, of which Figure 1 is a diagrammatic illustration of a conventional radiation level monitor apparatus; Figure 2 is a diagrammatic illustration of the combination of the safety device of the present invention with the conventional radiation level monitor apparatus of Figure 1; and Figure 3 is a detailed showing of a specific radiation level monitor apparatus provided with a specific safety device of the present invention.

Referring now to Figure 1, reference character 10 designates a conventional radiation detector. Detector 10 may be of the ion collection type including those operating on the basis of saturation ion collection or multiplicative ion collection, or it may be of the scintillation counter type. Specifically, radiation detector 10 may be, for example, a Lauritsen type electroscope, a Geiger-Müller counter, a proportional counter or a scintillation counter. Detector 10 is employed to detect the intensity of radiation A (the radiation being monitored) which may reach unsafe or dangerous levels. Radiation A may comprise alpha rays, beta rays or gamma rays or combinations thereof. Usually the monitor system shown in Figure 1 will be installed in places where there is potentially dangerous gamma radiation because gamma radiation is much more penetrating than either alpha rays or beta rays. The monitor apparatus in Figure 1 is frequently installed in radiation laboratories, near atomic piles (nuclear reactors) or the like.

An electrical signal substantially proportional to the intensity of the radiation detected by detector 10 (radiation A) is then sent to amplifier 11. These amplifiers may be D.C. amplifiers or A.C. amplifiers. The amplified electrical signal is then transmitted to meter 12. It will be understood that amplifier 11 may also include means for changing the nature of the electrical signal as well as amplification means. Meter 12 is generally a galvanometer which may be either current sensitive or voltage sensitive. Usually meter 12 will be provided with a dial face 13 including a scale 14 and an indicator needle 15. The reading on dial 13 is generally proportional to the electrical signal received by meter 12 which in turn is proportional to the intensity of radiation detected by detector 10. Meter 12 may be provided with a high level alarm set or contact 16 which is set at a position on scale 14 corresponding to the level of radiation considered unsafe or hazardous. When the reading on scale 14 reaches the point of contact 16, an electrical signal is transmitted to high level alarm 17 which then indicates to personnel the presence of dangerous or unsafe radiation. High level alarm 17 may operate either visually or audibly. More specifically, high level alarm 17 may comprise flashing red lights, a bell, whistle, Klaxon, etc. The radiation level monitor apparatus shown in Figure 1 and described above is well known in the art. For example, such apparatus is described in detail in chapter 8, pages 224 to 249, of the book, "Nuclear and Radio Chemistry," by G. Friedlander and J. Kennedy (1955).

Referring now to Figure 2, the safety device of the present invention in combination with the conventional radiation level monitor apparatus will now be discussed. In accordance with the present invention, a source 20 of substantially constant low level radiation is disposed near radiation detector 10. Radiation source 20 emits a substantially constant and uniform low level radiation B. If desired, radiation source 20 may represent an accelerator such as a small Van de Graaff generator or the like. However, preferably, radiation source 20 comprises a radioisotope which emits substantially constant and uniform low level radiation. A preferred radioisotope is one having a relatively long half life. Generally the desired half life will be related to the permanency of the radiation level monitor apparatus. However, since most radiation level monitor apparatus is installed on a permanent basis, the radioisotope preferably has a half life of at least about 1 year and more preferably at least about 5 years. Although these relatively long half lives are not absolutely essential to the present invention, for practical purposes such half lives are highly desirable.

The intensity of radiation source 20 should generally not be so high as to emit dangerous and unsafe radiation. On the other hand, the intensity of radiation source 20 should be sufficient to be detected by detector 10 so as to transmit a measurable small electrical signal to meter 12. When relatively high intensity sources are employed, radiation source 20 may be shielded in a way so as to reduce the radiation emitted generally from the source but to still emit radiation to detector 10 of a measurable quantity. Generally when radioisotopes are employed, they will have radiation intensities equivalent to about 0.0001 to 10 millicuries, preferably about 0.1 to 1.0 millicurie. Generally it will be desirable to arrange radiation source 20 as close to detector 10 as possible since this will reduce the amount of the radioisotope required. Generally the radiation source 20 will be placed within about 0.1 to 10.0 inches of the ionization chamber (or equivalent thereof) of detector 10. The type and quantity of radioisotope as well as the distance of radiation source 20 from detector 10 should be selected such that about 0.0001 to 0.10, preferably about 0.001 to 0.025, roentgen per hour of radiation are received by detector 10. Generally it will be desirable that at least about 3% and preferably at least about 30% of the radiation emitted by radiation source 20 be received by detector 10.

The radioisotopes which may be employed as radiation source 20 may be those which emit alpha, beta and gamma rays or combinations thereof. Preferably the type of radiation emitted by the radioisotope is the same as that being monitored by the radiation level monitor system. More particularly, an alpha ray emitter would preferably be employed when monitoring for alpha rays; a beta ray emitter would be employed when monitoring for beta rays; and a gamma ray emitter would be employed when monitoring for gamma rays. Since most radiation level monitor systems are installed primarily for gamma rays, a gamma ray emitting radioisotope is preferably selected for radiation source 20.

The following are specific examples of radioisotopes useful in the present invention which may serve as radiation source 20:

*Radioisotopes emitting alpha rays*

| Radioisotope: | Half life |
|---|---|
| Radium$^{226}$ | 1600 yrs. (preferred). |
| Polonium$^{210}$ | 140 days. |
| Plutonium$^{234}$ | $2.4 \times 10^4$ years. |
| Actinium$^{227}$ | 21.7 years. |
| Thorium$^{230}$ | $8 \times 10^4$ years. |

*Radioisotopes emitting beta rays*

| Radioisotope: | Half life |
|---|---|
| Strontium$^{90}$ | 25 years (preferred). |
| Thallium$^{204}$ | 27 years. |
| Technetium$^{99}$ | $2.2 \times 10^5$ years |
| Promethium$^{147}$ | 4 years. |

*Radioisotopes emitting gamma rays*

| Radioisotope: | Half life |
|---|---|
| Cobalt$^{60}$ | 5.3 years (preferred). |
| Radium$^{226}$ * | 1600 years. |
| Silver$^{110}$ | 270 days. |
| Ruthenium$^{106}$ | 1 year. |
| Zinc$^{65}$ | 250 days. |

*Preferred with alpha shield.

In accordance with the present invention, radiation B (and radiation A, if any) is detected by detector 10 and transmitted as a proportional electrical signal to amplifier 1 which in turn transmits a proportional amplified electrical signal to meter 12. Thus if the radiation monitor apparatus is operating properly, an intensity of radiation at least equivalent to that emitted by radiation source 20 and detected by detector 10 will be indicated on scale 14 of meter 12. The proper functioning of meter 12 can thus be noted visually by observing scale 14. Preferably an alarm system is also provided. More particularly, meter 12 is thus provided with a low level alarm contact 21 which is arranged in relationship with scale 14 to be above the zero point and below the scale reading resulting solely from the radiation emitted from radiation source 20. Generally, low level alarm contact 21 will be set at about 10 to 90% of the scale reading resulting solely from the radiation from the essentially constant radiation source 20 (radiation B). This contact may be adjusted from time to time as required to compensate for any gradual loss in radioactivity of radiation source 20. If the radiation level monitor apparatus fails because of power failure, tube failure, physical damage, etc., the electrical signal received by meter 12 will cease or at least substantially decrease and in so doing will move to contact 21.

Low level alarm contact 21 will generally be operated by an electrical system independent of the electrical system for the conventional radiation level monitor apparatus (e.g., emergency batteries). When the monitor apparatus fails, an electrical signal will be sent from contact 21 to low level alarm 22. Low level alarm 22 may be a visual or audible type of alarm. More particularly, alarm 22 may comprise flashing lights, bells, whistles, Klaxons, etc. Preferably, alarm 22 is an audible alarm. It is preferred that the specific type of alarm representing alarm 22 be different from that of alarm 17. More specifically, alarm 22 could be a bell whereas alarm 17 could be a whistle or Klaxon.

It will be seen from the above discussion that the present invention provides a simple and effective means for indicating the failure of conventional radiation level monitor apparatus. More particularly, the operation of low level alarm 22 indicates to personnel that the monitor apparatus is not operating properly and is in need of repair. In this way, accidents resulting from personnel receiving dangerous radiation dosages are prevented. Without the present safety device, it would be impossible to maintain safe working conditions without constantly checking meter 12.

A safety device of the present invention installed in a radiation laboratory wherein radiation studies are made (using a cobalt$^{60}$ source having an intensity of about 3,000 curies as a source of gamma rays) has proved to be extremely useful and dependable. More particularly, the following is a detailed description of this radiation level monitor apparatus in combination with a safety device of the present invention.

A detailed drawing of the radiation detection system is shown in Figure 3. It consists of an ion chamber radiation detector, a small source of radiation, a cathode-follower type vacuum tube current amplifier, a sensitive current indicating meter with high and low current level contacts, a pair of sensitive relays for operating both visual and audible alarms, a battery for the source of alarm power, and a power line operated filament and plate voltage power supply.

The radiation detector is a completely enclosed metal cased ion chamber containing dry air. A metal inner probe extends into the enclosed gas space and is insulated from the outside case. The current caused by ionization of the air in the chamber as the result of radiation is measured between the outside metal enclosures and the inner metal probe. The volume of air in the chamber is 21.4 liters at standard conditions. This volume of air in a field of 200 mr. (milliroentgens)/hr. of gamma radiation results in a flow of current of $45 \times 10^{-11}$ A. The radiation detection chamber is connected in series with a $10^{11}$ ohm resistor across a source of 400 volts. Any change in the ion chamber current flow results in a change in the flow of current through the $10^{11}$ ohm resistor and appears as a change in voltage at the grid of electrometer pentode 5886. At 200 mr./hr. radiation level this voltage would be:

$$(45 \times 10^{-11} \text{ A.}) \times 10^{11} \text{ ohms} = 45 \text{ volts}$$

Electrometer pentode 5886 and current amplifier 6SF5 are connected in a cathode follower circuit to provide constant plate voltage on the electrometer pentode 5886 and a voltage amplification of unity between the grid of the electrometer pentode and the cathode of the current amplifier.

This results in a current amplification which provides 100 μa. through the .45 megohm resistor in series with the meter at a voltage change of 45 volts at the grid of the electrometer pentode. A ten-fold increase in sensitivity may be obtained by replacing the .45 megohm series resistor with a 45,000 ohm resistor. The meter is adjusted to the zero current position by the 2000 ohm zero adjustment potentiometer under radiation conditions at background level.

A small radiation source of radium$^{226}$ is placed near the ion chamber to produce a field of 2.5 mr./hr. at the detector. High level alpha radiation is absorbed in a thin metal shield around this source.

The 100 μa. indicating meter is filled with adjustable contacts which complete a circuit through the moveable pointer at certain pre-set levels of current. In practice the detection system is operated on the 0–20 mr./hr. setting. The lower limit is set to approximately 10 μa. on the meter or 2.0 mr./hr. and the high limit is set to 90 μa. or 18 mr./hr. The contacting of either of these limit settings results in the operation of the high or low limit sensitive relays. The contacts of these relays, when actuated, close the alarm circuit to the Klaxon and a light to indicate high level radiation or low level equipment failure. Power for the Klaxon and indicating lights is supplied by a 6 volt storage battery. The battery is maintained at full charge by a simple charger circuit operating from the normal power line.

Approximately 400 volts of plate voltage and main operating voltage is supplied by a transformer, rectifier, condenser and filter resistor combination. A.C. filament power for the 6SF5 current amplifier is supplied from a winding on the transformer. D.C. filament power for the electrometer pentode 5886 is supplied by a low voltage winding on the power transformer in combination with a rectifier, condenser and resistor. The line voltage to the power transformer is obtained from a regulated line.

What is claimed is:

1. In a system adapted to measure and indicate relatively high amounts of ionizing radiation harmful to humans, comprising a radiation level monitor apparatus which includes a radiation detector, means for producing an electrical signal proportional to the intensity of the detected radiation, and a meter for measuring and indicating said electrical signal; the improvement characterized by, a safety device comprising a source of substantially constant and uniform low level ionizing radiation contiguous to said radiation detector, whereby said meter, when said radiation monitor apparatus is operating properly, receives a substantially uniform and constant low level electrical signal because of radiation emitted from said source when said radiation detector is not exposed to another source of ionizing radiation; and indicating means for positively indicating lack of receipt of said substantially uniform and constant low level electrical signal by said meter, when said radiation level monitor apparatus is not functioning properly.

2. The apparatus according to claim 1 wherein said source is a radioisotope and the radiation received from said radioisotope by said radiation detector is in the range of 0.001 to 0.025 roentgen per hour.

3. In a system adapted to measure and indicate relatively high amounts of ionizing radiation harmful to humans, comprising a continuous radiation level monitor apparatus which includes a radiation detector, means for producing an electrical signal proportional to the intensity of the detected radiation by said radiation detector, and a meter for measuring and indicating said electrical signal; the improvement characterized by a safety device for positively indicating malfunctioning of said radiation level monitor apparatus, comprising a 0.1 to 1.0 millicurie radioisotope source having a half life of at least five years and emitting gamma rays contiguous to said radiation detector such that the ionizing radiation received by said detector from said radioisotope source is in the range of 0.001 to 0.025 roentgen per hour, whereby said meter when said radiation level monitor apparatus is operating properly, receives a substantially uniform and constant low level electrical signal because of the ionizing radiation of said radioisotope source; and indicating means associated with said meter for positively indicating lack of receipt of said substantially uniform and constant low level electrical signal when said radiation level monitor apparatus is not functioning properly.

4. The apparatus of claim 3 wherein said indicating means comprises an audible alarm.

References Cited in the file of this patent

UNITED STATES PATENTS

| | | |
|---|---|---|
| 2,666,857 | McLaren et al. | Jan. 19, 1954 |
| 2,700,108 | Shamos | Jan. 18, 1955 |
| 2,818,509 | Johnston | Dec. 31, 1957 |